R. R. BOWERS.
HAY GATHERING AND LOADING MACHINE.
APPLICATION FILED OCT. 7, 1918.
1,361,302.
Patented Dec. 7, 1920.
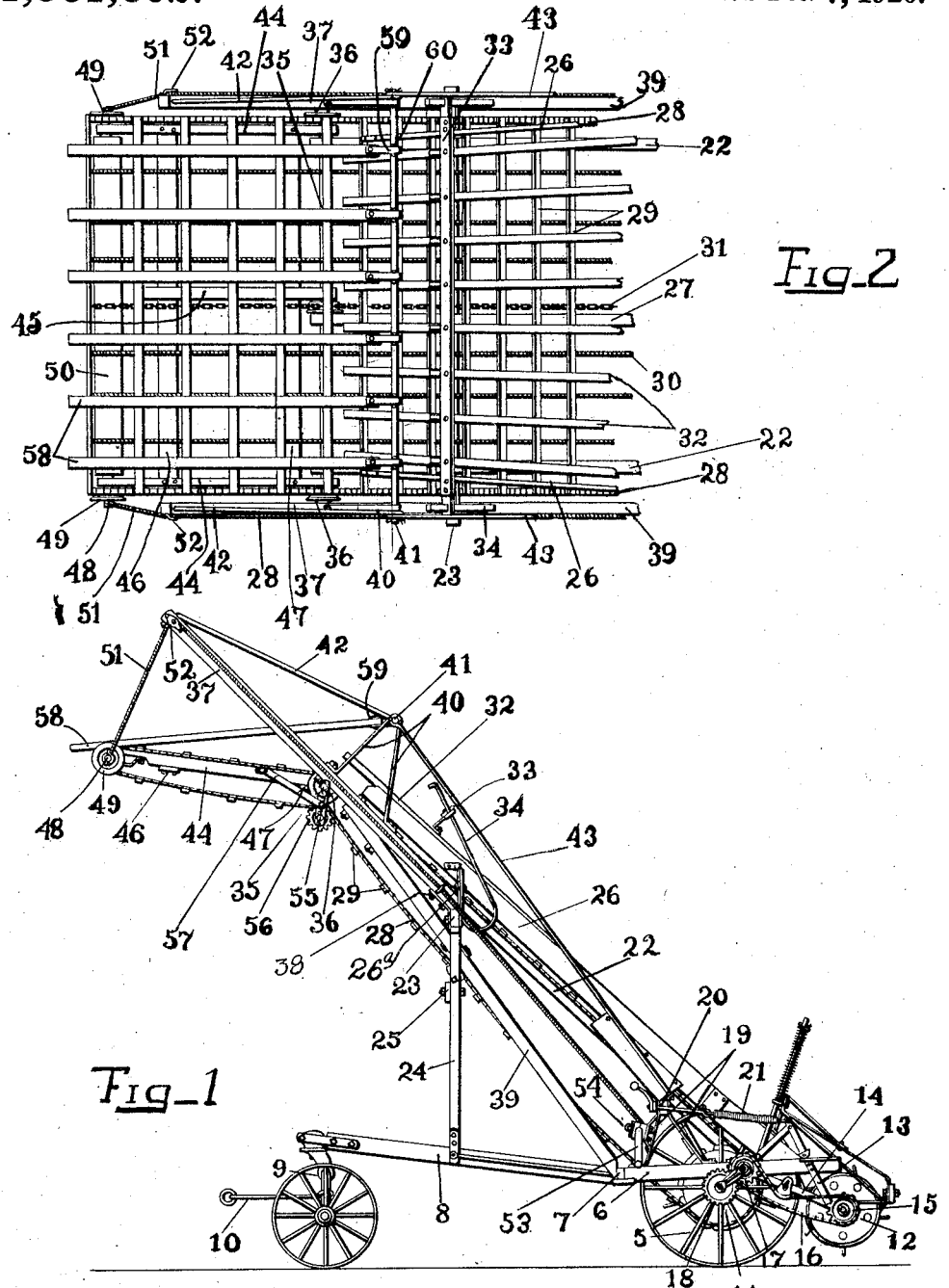

UNITED STATES PATENT OFFICE.

ROBERT R. BOWERS, OF OTTUMWA, IOWA, ASSIGNOR TO THE DAIN MANUFACTURING COMPANY OF IOWA, OF OTTUMWA, IOWA, A CORPORATION OF IOWA.

HAY GATHERING AND LOADING MACHINE.

1,361,302. Specification of Letters Patent. Patented Dec. 7, 1920.

Application filed October 7, 1918. Serial No. 257,186.

*To all whom it may concern:*

Be it known that I, ROBERT R. BOWERS, a citizen of the United States, and a resident of Ottumwa, in the county of Wapello and State of Iowa, have invented certain new and useful Improvements in Hay Gathering and Loading Machines, of which the following is a specification, reference being had to the accompanying drawing.

This invention relates to that type of hay gathering and loading machines comprising a wheeled frame from which is supported two oppositely-rotating toothed cylinders located one in rear of the other, and with the rear one flexibly supported, between which cylinders as the machine is moved along across a field the hay is gathered up and deposited on an endless carrier that is movably supported by a forwardly-inclined frame and from which carrier it falls upon a wagon to the rear of which the machine is hitched. As the load of hay on the wagon grows in height it is very desirable that the delivery end of such carrier be correspondingly raised and various means have been devised for such purpose. Such means have included the provision of a second endless carrier that could be moved into operative position opposite the upper end of the main or first carrier, to which second or auxiliary endless carrier the hay would be transferred to complete its delivery to the pile on the wagon. Such auxiliary endless carriers have been found objectionable on account of their complexity as well as the additional cost entailed in the construction of machines that embody them.

It is the leading object of my invention to so construct a machine of the general type referred to that but one endless carrier is required but which carrier may be readily adjusted so that it will deliver the hay at varying heights and thus accommodate its delivery to the successive heights that the load upon the wagon acquires. Briefly stated, I accomplish such object by hingedly attaching to the upper end of the main inclined frame that supports the endless carrier a supplemental frame that is provided with rotary members, such as grooved wheels and a roller, for the endless carrier to move over and be guided by. Such supplemental supporting frame requires, of course, to be properly supported in any of its various adjusted positions, and it is a further object of the invention to provide novel supporting means for that purpose with which are associated means for effecting the desired adjustment of the said supplemental frame. It is further an object of the invention to provide means for automatically taking up or preventing slack in the endless conveyer that would naturally be occasioned by the position assumed by the supplemental frame when it is turned down to discharge at less than the maximum height, and which slack would come in contact with the load on the wagon and drag the hay off of the rear of such load. Still another object of the invention is the providing of means supported over and movable with the hinged supplemental frame and adapted to hold the hay on that part of the carrier passing over such supplemental frame. The means devised by me for accomplishing these objects are hereinafter particularly described and those things that I belive to be novel will be found set forth in the claims.

In the drawings:—

Figure 1 is a side elevation of a hay gathering and loading machine in which my improvements are embodied; and Fig. 2 is a plan view of the upper portion of the endless carrier and parts connected therewith.

Referring to the drawings,—5 indicates a supporting and drive wheel—two, of course, being employed one at each side of the machine, and supported from each wheel is a longitudinal sill 6, the forward ends of which are connected by a transverse bar 7, said parts 6 and 7 constituting the main supporting frame. 8 indicates a draft frame extending forward from the said main frame. The forward end of the draft frame is supported upon a wheeled truck 9 of any ordinary construction, said truck being provided with a hitch member 10 adapted to be connected to the rear end of a hay wagon. Between the two supporting wheels 5 and connected therewith so as to rotate with them is an ordinary toothed cylinder 11. 12 indicates another toothed cylinder located in the rear and flexibly supported at each end by bars 13 and 14 that are connected with the main frame. The rear toothed cylinder 12 is caused to rotate and in the opposite direction to the rotation of the other cylinder. Such rotation of the cylinder 12 is effected by means of a link belt 16 that passes around a sprocket 15 on the end of the shaft on which the cylinder 12 is secured, said chain also passing around a sprocket 17 journeled on the main frame, such sprocket 17 being driven by a spur gear 18 fixedly secured to the wheel 5. The cylinder driving mechanism may be duplicated at each side of the machine. 19 indicates upwardly extending brackets secured to the sills 6, said brackets supporting at their upper ends a transverse bar 20, which bar forms one of the supports for the inclined elevator frame. 21 indicates a spring adjustably connected with the bar 20 and connected at its rear end to the cylinder supporting bar 13, such construction thus providing a yielding support for the rear cylinder 12.

The forwardly and upwardly inclined elevator over which the hay is passed by the carrier hereinafter referred to, comprises side sills 22 which are secured near their lower ends to the transverse bar 20, such sills being supported near their upper ends upon a transverse bar 23, which latter is braced from the draft frame 8 by two uprights, one of which is shown and indicated by 24, and the two uprights are secured together by a cross-piece 25. At the sides of the elevator frame are the usual side boards 26 that prevent the hay from falling off at the edges of the elevator. These side boards are connected at their lower ends with the main wheeled frame and at their upper ends receive support from the transverse bar 23 to which they are each connected by a bracket 26ᵃ, that rises therefrom—the upper end of the bracket being turned, as shown, and bolted or otherwise fastened to the outer face of the side bar. Midway between the sills 22 of the elevator frame is provided another sill, indicated by 27. The endless carrier that moves over such elevator frame is shown as comprising two link belts 28 connected together at intervals by slats 29. Such slats are also preferably secured together by a plurality of small ropes 30 that aid in supporting the hay that is being moved upwardly. The slats 29 are also shown as being connected together at their central portions by an ordinary chain 31 which supports and strengthens the slats and prevents them from breaking under heavy loads. Above the carrier and between the side boards are a plurality of compressor slats 32 that hold the hay against the carrier slats while such hay is being moved upward. These compressor slats 32 are supported at their lower ends from the main frame and near their upper ends are slidingly supported by a transversely arranged bar 33 that is yieldingly carried by bow-springs 34 that are secured to the transverse bar 23 and the brackets 26ᵃ. Mounted in the upper ends of the elevator side sills 22 and the center sill 27 is a shaft 35 upon which are rotatably mounted flanged wheels 36 over which the belts 28 and chain 31 travel. The parts that have been thus briefly described are of ordinary construction except that the endless carrier which is here shown as passing beyond the wheels on the shaft 35 has heretofore been turned and passed down and around such wheels—in other words, the endless carrier has been of such length as to only extend to and pass around the wheels on said shaft 35.

Coming now to those features of construction with which my invention is more particularly concerned and which features enable the endless carrier to project at a considerable distance beyond the shaft 35 and allow such projected portion to be moved into a number of operative positions—37 indicates bars that constitute fixed extensions of the elevator bars 22. These extension members lie alongside of the outer faces of the bars 22 and as shown are secured at their lower ends to the transverse bar 23 and the brackets 26ᵃ—the connection of each being further reinforced by a strap brace 38. Further support is given to these extension members by braces 39 that extend down to and are connected with the forward end of the main wheeled frame—each strap brace 38 being also preferably secured to the upper face of one of the braces 39. Each extension member 37 is also supported from above by a truss comprising uprights 40, a cross-bar 41 supported in the upper ends of the two sets of uprights and truss rods 42 and 43 extending forwardly and rearwardly, respectively, and the former being secured at its forward end to the outer end of the adjacent extension member 37 while the latter is secured to one of the brackets 19 that supports the transverse bar 20.

Pivotally mounted upon the cross-bar 35 near its ends are two bars 44 connected together in the construction shown by cross-pieces 46 and 47, such construction thus constituting a swinging frame. In the outer end portions of the members 44 of this swinging frame is secured a shaft upon which near each of its ends is mounted a flanged wheel 49, over which wheels the link belts 28 of the endless carrier pass. Between the flanged wheels 49 there is mounted on the shaft a roller 50 over which the slat ropes 30 and the slat chain 31 run. 45 indicates another member of the swinging frame referred to, such member being pivotally connected to the shaft 35 at about the center of such shaft, and being suitably connected to the cross-pieces 46 and 47, thus considerably stiffening the frame and aiding in supporting the hay that passes onto such frame.

The auxiliary swinging frame above described is adjustably suspended from the extension members 37 by two cables 51 each of which is connected at one of its ends to an end portion of the shaft 48, each of such cables thence extending upwardly over a pulley 52 carried at the outer end of one of the extension members 37 and thence downwardly alongside of such member 37 to a drum that is rotatably supported by the brackets 19 at each side of the main frame. On one end of such drum will be provided a crank 53 by which such drum will be rotated to wind up or let out the said cables, by which operation, of course, the swinging frame referred to will be turned to any desired position and it will be secured in place by means of a pin such as 54 which can be inserted through a hole in the drum and its support to lock such drum against rotation.

By reason of the pivotal connection of the swinging frame over which the endless carrier travels, it will be evident that when such frame is turned down out of alinement with the main elevator frame the distance in a straight line between the wheels 48 carried at the outer end of such swinging frame and the drum from which the driving power for the carrier is derived is decreased, and hence the endless carrier will have more or less slack in the return part, unless means are provided to counteract it, the amount varying of course with the extent to which the swinging frame is moved down. Such slackness will, unless prevented, come in contact with the load being formed on the wagon and thereby not only seriously interfere with the operation of the carrier but will drag off some of the hay on the wagon. I have, therefore, devised means for overcoming this objection and maintaining the endless carrier under substantially uniform tension. This is accomplished by providing an automatically operating belt tightening means comprising at each side of the machine a strap 55 that depends from the cross-shaft 35 at substantially a right angle to the side bars 44 of the swinging frame, to the lower end of each of which straps is rotatably secured a toothed wheel 56 over which the link belts 28 respectively pass. Each of the wheel supporting straps 55 is held in proper fixed position relative to its adjacent bar 44 by a brace 57 extending between such strap and bar. The result of this construction is that as the swinging frame is moved out of alinement with the main elevator frame by being lowered as hereinbefore described, the tightener wheels 56 are swung back beneath the flanged wheels 36 and thus effectually hold the lower or return portion of the carrier from becoming slack as would, obviously, be the case if no such engaging means were provided for holding this part of the carrier up. The slack-preventing means turning, as they do, around the same axis as the swinging frame and being attached to such swinging frame through the braces 47 will in any of the lowered positions of such frame hold the under or return portion of the carrier in a position substantially parallel with such swinging frame, as indicated in Fig. 1.

To hold the hay properly on that portion of the carrier that is passing over the swinging frame, I provide a plurality of compressor or holding arms 58, each pivotally mounted on the cross-bar 41 and extending forwardly over the hay on the swinging frame, such arms being of sufficient weight to so hold the hay but not heavy enough to prevent their freely rising at their outer ends to permit the hay to pass beneath them for discharge upon the wagon below. In the construction shown, each of these arms 58 is connected to the cross-bar 41 by a clevis 59 that acts as a hinge, and each slat is held from movement longitudinally of the cross-bar by cotters 60 that extend through the bar at each side of the clevis. Of course, any other desired means for hingedly connecting the arms 58 in place and securing them against movement endwise of the cross-bar to which they are attached could be employed. In the construction shown each arm or slat is free to move independently which is of advantage owing to the irregularity of the surface of the hay that is being moved.

From the foregoing description it will be understood that the hay is collected and moved upward on the rigid elevator frame by means of the endless carrier as in former constructions, but that by reason of the auxiliary or swinging frame that I have added to the old construction and by lengthening the endless carrier so that it may pass over and around the rotary members carried at the outer end of such auxiliary frame I am able to have the hay drop upon the wagon not only from a higher point than in the old constructions, but from a point lower than the former discharging point, and am able to regulate with ease and quickness the height of the point of discharge to correspond to the height of the load being built up on the wagon.

What I claim as my invention and desire to secure by Letters Patent, is—

1. A hay-loader comprising in combination an inclined elevator frame, a supplemental frame hingedly connected to the upper end of said elevator frame, an endless carrier supported by said frames, a wheel adjacent the joint between said frames and engaging the carrier, pivoted means for supporting said wheel, and a rigid connection between said wheel-supporting means and supplemental frame for compelling a positive movement of the wheel-supporting means when the supplemental frame is turned in either direction.

2. A hay-loader comprising in combination an inclined elevator frame, a supplemental frame pivotally connected with the upper end of said elevator frame, an endless carrier supported by said frames, and means for preventing slack in said carrier when the said supplemental frame is swung downward, said means comprising a member pivoted to a fixed support and a rigid connection extending between said member and the supplemental frame for compelling a positive movement of said member when the supplemental frame is turned in either direction.

3. A hay-loader comprising in combination an inclined elevator frame, a supplemental frame pivotally connected with the upper end of said elevator frame, an endless carrier supported by said frames, and means for preventing slack in said carrier when the said supplemental frame is swung downward, said means comprising a member pivotally connected to the elevator frame on the same axis as the connection of the supplemental frame and a rigid connection extending between said member and the supplemental frame for compelling a positive movement of the said member when the supplemental frame is turned in either direction.

4. A hay-loader comprising in combination an inclined elevator frame, a supplemental frame hinged thereto, means for supporting said supplemental frame at varying angles, an endless carrier supported by both frames, means for moving said carrier, and means for holding that portion of the carrier that passes beneath the supplemental frame substantially parallel with said supplemental frame, said holding means comprising a pivotally suspended guide member adjacent to the point of connection of said two frames and a device connecting said guide member with said supplemental frame for compelling a positive movement of the said guide member when the supplemental frame is turned in either direction.

5. A hay-loader comprising in combination an inclined elevator frame, a supplemental frame hinged thereto, means for supporting said supplemental frame at varying angles, an endless carrier supported by both frames, a portion of such carrier-supporting means including rotary devices mounted upon the same axis that the supplemental frame turns upon, means for moving said carrier, and a pivotally suspended guide member movable with said supplemental frame for engaging said carrier to hold a portion thereof substantially parallel with said supplemental frame in all positions of said frame.

6. A hay-loader comprising in combination an inclined elevator frame, a supplemental frame hinged thereto, means for supporting said supplemental frame at varying angles, an endless carrier supported by both frames, a portion of such carrier-supporting means including rotary devices mounted upon the same axis that the supplemental frame turns upon, means for moving said carrier, and a guide member for engaging said carrier to hold a portion thereof substantially parallel with said supplemental frame in all positions of said frame, said guide member being pivotally suspended from a point coinciding with the axis of the supplemental frame and being connected to and positively movable in both directions with said supplemental frame.

7. A hay-loader comprising in combination an inclined elevator frame, a supplemental frame pivotally connected with the upper end of said elevator frame, an endless carrier supported by both of said frames and movable around said supplemental frame in all of the adjusted positions of the latter, and supporting means for said supplemental frame consisting of two bars at the side of said elevator frame projecting beyond the upper end thereof, a truss brace for each bar, one member of which is secured to the elevator frame, and flexible connections fastened to said supplemental frame and passing over guides carried by said arms.

8. A hay-loader comprising in combination an inclined elevator frame, a supplemental frame hinged to the upper end of the elevator frame, means for supporting said supplemental frame in different adjusted positions, an endless carrier supported by said frames and passing around the supplemental frame, a cross-bar supported from the elevator frame at a distance above said carrier, and a plurality of hay-compressing slats independently and pivotally connected at their rear ends with said cross-bar and projecting over said supplemental frame.

ROBERT R. BOWERS.